Feb. 1, 1955  E. M. CANNON  2,701,169
MUD LUG FOR ENDLESS TRACTION TRACK LINKS
Filed Aug. 18, 1954  2 Sheets-Sheet 2
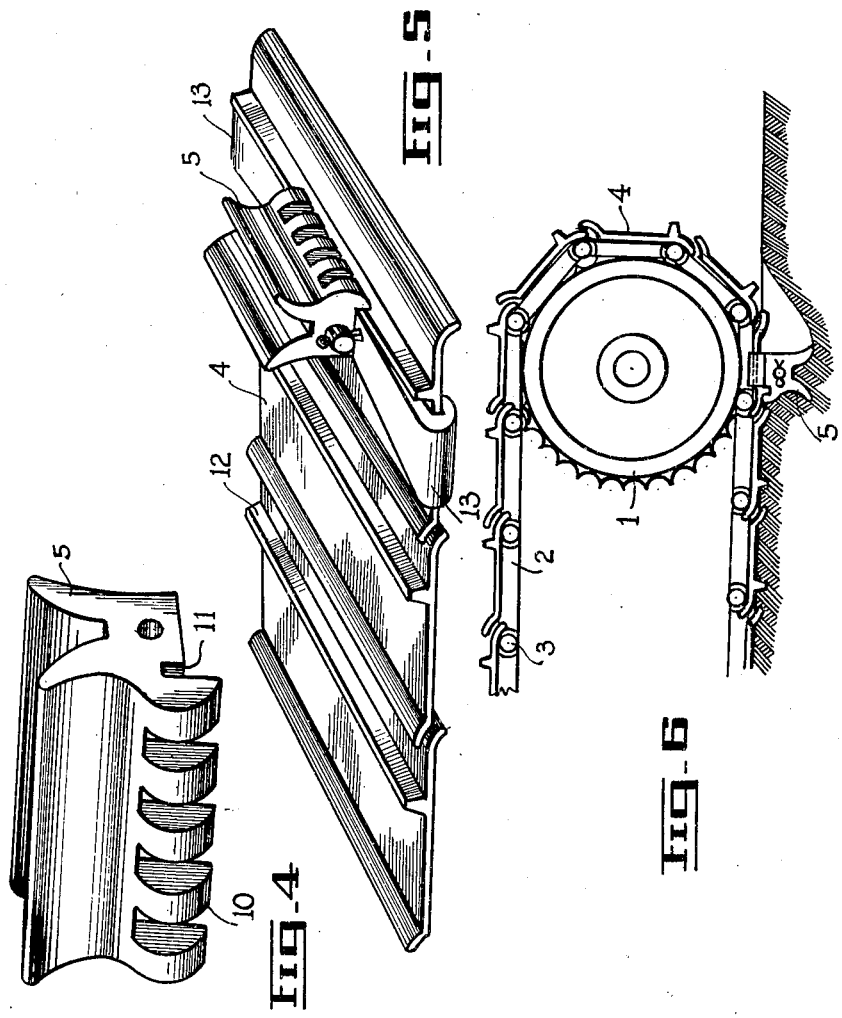
INVENTOR
Edgar M. Cannon
Ralph Burch
ATTORNEY

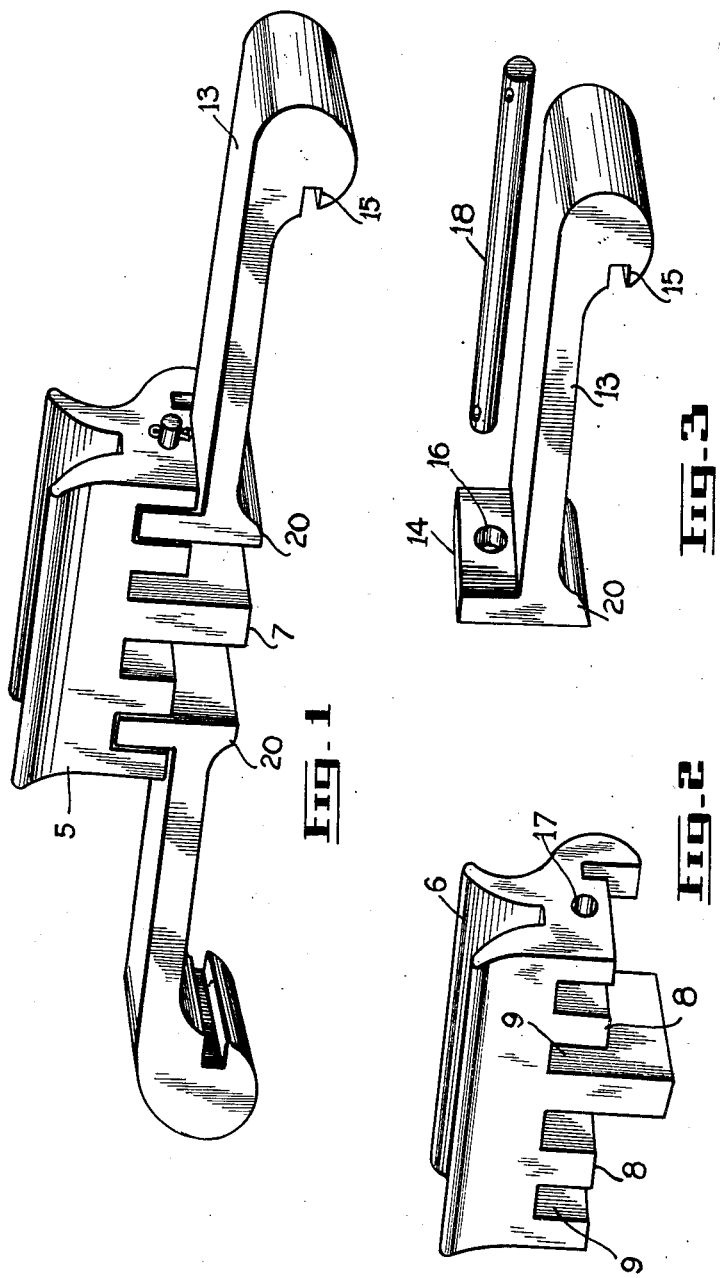

United States Patent Office 2,701,169
Patented Feb. 1, 1955

2,701,169

MUD LUG FOR ENDLESS TRACTION TRACK LINKS

Edgar M. Cannon, Summerside, Prince Edward Island, Canada

Application August 18, 1954, Serial No. 450,701

5 Claims. (Cl. 305—10)

This invention relates generally to endless traction track treads, and in particular to track treads having additional traction means, such as mud lugs attached thereto in case of emergency.

It is well known that endless track tractors often have great difficulty in obtaining good traction when wet or sticky to the shoes, or treads, and forms a smooth surface thereon, so that as traction can be obtained, and this is also true to a lesser extent when snow, or ice conditions are encountered.

It is an object of this invention to overcome this difficulty by the addition of a detachable mud lug to a tread link, or a plurality of such elements, to as many tread links as necessary.

Another object of this invention is to provide a mud lug having means to attach said mud lug to an endless traction tread link.

A further object of the invention is the provision of a tread link having means thereon to retain a mud lug thereon in such manner that it will not slip sideways, or lengthwise, of said tread link.

A still further object of this invention is the provision of a mud lug having adjustable means for attachment to treads of varying widths.

The foregoing and other objects and advantages of the invention will appear more fully hereinafter from a consideration of the detailed description which follows, taken together with the accompanying drawings as illustrated by way of example in which:

Figure 1 is a perspective view of a mud lug assembled for attachment to an endless track tread link.

Figure 2 is a detail view in perspective of a mud lug.

Figure 3 shows a view in perspective of one of the clamps, and pin, for attaching a mud lug to a tractor tread link.

Figure 4 is a detail perspective view of a mud lug similar to that in Fig. 2, viewed from the opposite side.

Figure 5 is a view in perspective showing of a mud lug in assembled position on a tractor tread link, and Figure 6 is a side elevational view of an endless track tread showing a mud lug attached to a tread link, and the co-operation between the endless track treads, and a sprocket drive wheel.

Similar reefrence numerals designate corresponding parts in all the figures of the drawings.

Referring now to the drawings, Figure 6 shows in diagrammatic form an assembly of an endless track laying traction tread having a driving sprocket wheel 1, track links 2, pivot pins 3, and tread plates 4, one of said treads having my improved mud lug 5, attached thereto, and in operative engagement with the soil.

The construction of mud lug 5, and the assembly thereof on tread plate 4, as shown in Figs. 1 to 5, inclusive, will now be described.

My improved mud lug 5 is constructed having wings 6, forming a V shape to obtain good tractive contact with the soil, and flared outwardly to eject the soil as the lug emerges from the ground. The under side of the mud lug 5 is formed having a centre part 7, engaging tread plate 4, and two shorter parts 8, forming slots 9, to accommodate the attaching means. A series of fingers 10 are formed on one side of the mud lug, projecting outwardly therefrom, and a groove 11 is formed in the mud lug adjacent said fingers to engage a rib, or cleat 12, formed on tread plates 4, and thereby, prevent the mud lug from slipping lengthwise on said tread plate, the foregoing construction being disclosed in Figs. 2, 4, and 5.

The clamping means for detachably connecting the mud lug to a tread plate, are disclosed in detail in Figs. 1 and 3.

A pair of clamps are provided to engage mud lug 5, and as they are identical in construction, one only will be described.

The clamp comprises a flat bar 13, having an upstanding lug 14 formed at one extremity to engage one of the slots 9, in the mud lug, and formed with a thickened and rounded end at the extremity remote from said lug, said rounded end being provided with a recess 15, to engage the outer edge of a tread plate 4, a hole 16 is drilled in said upstanding lug 14, and a similar hole 17 is drilled through mud lug 5, said holes 16 and 17 being in alignment when assembled, and adapted to receive a pin 18, to lock the assembly in position, said pin being retained in position by cotter pins 19, as shown in Fig. 1, though other conventional retaining means may be used as desired.

The mud lug and clamps may be formed of any conventional metal, but are preferably constructed of cast steel or manganese steel for economy in manufacture, and durability. To assemble the mud lug 5 on the endless track, clamps 13 are first hooked over the edges of tread plate 4, as disclosed in Fig. 5, adjacent the rib 12, and mud lug 5 is then placed over the clamps in such manner that the lugs 14 engage one of the slots or recesses 9, in mud lug 5, and fingers 10 and groove 11 engage rib 12 on the said tread plate. Holes 16 and 17 then being in alignment pin 18 is inserted therethrough, and the assembly is then locked in position for operation.

It will be noted that a plurality of slots 9 are formed in mud lug 5, and these are for purposes of adjustment to accommodate tractor treads of varying widths, a pair of slots being shown on each side of centre part 7, by way of example, but the mud lug may be constructed having three or more slots as required.

Lug 14, on clamp 13, is shown extending downwardly to a point 20, so that when the assembly is locked in position on the tread plate, the bottom of part 7, of the mud lug, part 20, and the upper part of recess 15, will all be in alignment to effect a uniform bearing on tread plate 4, and the clamp 13, having only two bearing points on the tread plate, allows for less accuracy in casting, and at the same time provides a clearance between the clamp and tread plate for bolt heads used in attaching tread plate to track chain and for ease in handling.

Without further detailed description it will be seen that I have provided a detachable mud lug for an endless traction tread which is strong and durable, having few parts, which are readily replaceable when worn, inexpensive and simple to manufacture, which is readily assembled, and efficient in use.

It is believed that the construction and advantages of the structure shown may be apparent from the foregoing paragraphs taken in conjunction with the accompanying drawings without further detailed description.

While the preferred embodiment of the invention has been disclosed it is understood that minor changes in the construction, combination and arrangement of co-operating parts may be resorted to within the scope of what is claimed without departing from the spirit of the invention.

I claim:

1. In a mud lug for endless track treads, in combination, a tread plate, an upstanding rib, or cleat formed transversely thereon, a mud lug adapted to be detachably secured to said tread plate, said mud lug having V-shaped wings on one side thereof for engaging the soil, the opposing side being provided with alternate ribs and slots adapted to accommodate attaching means whereby said mud lug may be secured to said tread plate, said mud lug also being provided with a series of fingers adapted to bear against said tread plate rib, and a groove formed in said mud lug adjacent said fingers for engagement with said tread plate rib, said attaching means comprising a pair of clamps each clamp being provided with an upstanding lug adjacent one terminal adapted to engage one of the slots in said mud lug, the opposite terminal of said clamp being adapted to hook over an edge of said tread plate, means to lock said mud lug and clamps together in operative engagement with said tread plate.

2. A mud lug endless track treads, as set forth in claim 1, in which a hole is bored through said mud lug centrally thereof, and a similar hole is bored centrally through the upstanding lug on each of said clamps, said holes being in alignment when the device is assembled, said locking means comprising a pin adapted to be inserted in said holes, and to be secured therein.

3. A mud lug for endless track treads, as claimed in claim 1, in which the hooked terminal of said clamp comprises a thickened turned-over edge, and a recess formed in said thickened edge adapted to engage an edge of said tread plate.

4. A mud lug for endless track treads, as claimed in claim 1, in which said V-shaped wings on said mud lug are flared curvingly outward to prevent sticky soil from adhering thereto.

5. A mud lug for endless track treads, as set forth in claim 1, in which said alternate ribs and slots in said mud lug comprise a centre rib adapted to bear on said tread plate, and a plurality of shorter ribs adapted to bear on said clamps, said alternate ribs and slots providing for adjustment of said clamps to varying widths of tread plates.

No references cited.